(12) United States Patent
Lo et al.

(10) Patent No.: US 10,809,561 B2
(45) Date of Patent: Oct. 20, 2020

(54) DISPLAY PANEL

(71) Applicant: Au Optronics Corporation, Hsinchu (TW)

(72) Inventors: Yen-Hua Lo, Taichung (TW); Hsin-Chun Huang, Hsinchu County (TW); Wen-Rei Guo, Miaoli County (TW); Hsing-Yi Hsieh, Chiayi (TW)

(73) Assignee: Au Optronics Corporation, Hsinchu (TW)

( * ) Notice: Subject to any disclaimer, the term of this patent is extended or adjusted under 35 U.S.C. 154(b) by 20 days.

(21) Appl. No.: 16/033,248

(22) Filed: Jul. 12, 2018

(65) Prior Publication Data

US 2019/0079346 A1 Mar. 14, 2019

(30) Foreign Application Priority Data

Sep. 11, 2017 (TW) .............................. 106130949 A

(51) Int. Cl.
*G02F 1/1335* (2006.01)
*G02F 1/137* (2006.01)
(Continued)

(52) U.S. Cl.
CPC ........ *G02F 1/133528* (2013.01); *G02F 1/137* (2013.01); *G02F 1/1323* (2013.01);
(Continued)

(58) Field of Classification Search
CPC ............... G02F 1/133528; G02F 1/137; G02F 1/136286; G02F 1/13338; G02F 1/1323;
(Continued)

(56) References Cited

U.S. PATENT DOCUMENTS 6,396,553 B1 * 5/2002 Maruyama ............ G02F 1/1396
349/120
8,081,273 B2 12/2011 Choo et al.
(Continued)

FOREIGN PATENT DOCUMENTS

CN 1658035 8/2005
CN 104330915 2/2015
(Continued)

*Primary Examiner* — Nathanael R Briggs
*Assistant Examiner* — William D Peterson
(74) *Attorney, Agent, or Firm* — JCIPRNET

(57) ABSTRACT

A display panel includes a substrate, an opposite substrate opposite to the substrate, a liquid crystal layer disposed between the substrate and the opposite substrate, a pixel array disposed between the substrate and the liquid crystal layer, and first polarized patterns. The pixel array includes a plurality of scan lines, a plurality of data lines, a plurality of active devices, and a plurality of first electrodes. The active devices are electrically connected to the scan lines and the data lines. The first electrodes are disposed on the substrate. Each of the first electrodes includes a plurality of slits. The first polarized patterns overlap with the first electrodes in a direction perpendicular to the substrate. The first polarized patterns are disposed between the substrate and the opposite substrate. An extending direction of the first polarized patterns is different from an extending direction of the slits.

20 Claims, 14 Drawing Sheets

(51) Int. Cl.
*G02F 1/1362* (2006.01)
*G02F 1/1333* (2006.01)
*G02F 1/13* (2006.01)
*G02F 1/1368* (2006.01)
*G02F 1/1343* (2006.01)
*G06F 3/041* (2006.01)
*G02F 1/1337* (2006.01)

(52) U.S. Cl.
CPC ........ *G02F 1/1368* (2013.01); *G02F 1/13338* (2013.01); *G02F 1/133707* (2013.01); *G02F 1/134336* (2013.01); *G02F 1/134363* (2013.01); *G02F 1/136286* (2013.01); *G06F 3/0412* (2013.01); *G02F 2001/13706* (2013.01); *G02F 2001/13712* (2013.01); *G02F 2001/133531* (2013.01); *G02F 2001/133548* (2013.01); *G02F 2001/133565* (2013.01); *G02F 2001/134318* (2013.01); *G02F 2001/134372* (2013.01); *G02F 2201/121* (2013.01); *G02F 2201/123* (2013.01); *G02F 2201/128* (2013.01); *G06F 2203/04103* (2013.01)

(58) Field of Classification Search
CPC ............. G02F 1/1368; G02F 1/134336; G02F 1/134363; G02F 1/133707; G02F 2001/133531; G02F 2001/133548; G02F 2001/134318; G02F 2001/13706; G02F 2001/13712; G02F 2001/133565; G02F 2001/134272; G02F 2201/123; G02F 2201/121; G02F 2201/128; G02F 2203/04103
USPC .......................................................... 349/42
See application file for complete search history.

(56) References Cited

U.S. PATENT DOCUMENTS

| | | |
|---|---|---|
| 9,880,414 B2 | 1/2018 | Li |
| 2012/0057106 A1* | 3/2012 | Park .................. G02F 1/133528 349/96 |
| 2014/0049736 A1* | 2/2014 | Guo .................. G02F 1/133555 349/106 |
| 2018/0130929 A1* | 5/2018 | Kim .................. G02F 1/133345 |
| 2018/0181240 A1* | 6/2018 | Heo .................... H01L 51/5284 |

FOREIGN PATENT DOCUMENTS

| | | |
|---|---|---|
| CN | 105652504 | 6/2016 |
| CN | 106154655 | 11/2016 |
| CN | 107121719 | 9/2017 |

* cited by examiner

DISPLAY PANEL

CROSS-REFERENCE TO RELATED APPLICATION

This application claims the priority benefit of Taiwan application serial no. 106130949, filed on Sep. 11, 2017. The entirety of the above-mentioned patent application is hereby incorporated by reference herein and made a part of this specification.

BACKGROUND OF THE INVENTION

1. Field of the Invention

The invention is related to a display panel; more particularly, the invention is related to a display panel including polarized patterns.

2. Description of Related Art

Light is a type of electromagnetic wave which includes interacting electric and magnetic fields. The direction of the electric field of light is referred to as a "polarized direction". If the polarized direction of light continuously changes while the light moves forward, the light is referred to as "non-polarized light"; if the polarization direction of light remains unchanged while the light moves forward, the light is referred to as "polarized light".

A polarizing film is a component allowing only the light polarized toward a specific direction to pass through and absorbing the polarized light along the specific direction, such that non-polarized light is converted into polarized light. In a display device, such as a liquid crystal display, the polarizing film is used to control passage of light rays. However, the existing polarizing films are attached to outer sides of substrates of liquid crystal panels, which requires an additional process and thus increases the manufacture costs and the projection time of the liquid crystal. As a result, a method for solving the above problem is urgently needed.

SUMMARY OF THE INVENTION

The invention provides a display panel in which no additional polarizing film is required to be formed at an outer side of a substrate; thereby, the yield of the display panel may be increased, and the manufacturing costs of the display panel may be reduced.

In an embodiment of the invention, a display panel includes a substrate, an opposite substrate, a liquid crystal layer, a pixel array, and a plurality of first polarized patterns. The opposite substrate is opposite to the substrate. The liquid crystal layer is disposed between the substrate and the opposite substrate. The pixel array is disposed between the substrate and the liquid crystal layer. The pixel array includes a plurality of scan lines, a plurality of data lines, a plurality of active devices, and a plurality of first electrodes. The data lines and the scan lines are staggered. The active devices are electrically connected to the scan lines and data lines. The first electrodes are disposed on the substrate. Each of the first electrodes includes a plurality of slits. The first polarized patterns overlap with the first electrodes in a direction perpendicular to the substrate. The first polarized patterns are disposed between the substrate and the opposite substrate. An extending direction of the first polarized patterns is different from an extending direction of the slits.

Based on the above, in the display panel provided herein, the first polarized patterns are disposed between the substrate and the opposite substrate. Therefore, it is not necessary to form the polarizing film at the outer side of the substrate and/or the opposite substrate, whereby the manufacturing costs of the display panel may be reduced, and the yield of the display panel may be increased. In addition, the extending direction of the first polarized patterns provided in the invention is different from the extending direction of the slits in the pixel array. Owing to the alignment achieved by an alignment film, the display panel may accomplish better polarizing effects, and the liquid crystal efficiency may be enhanced.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
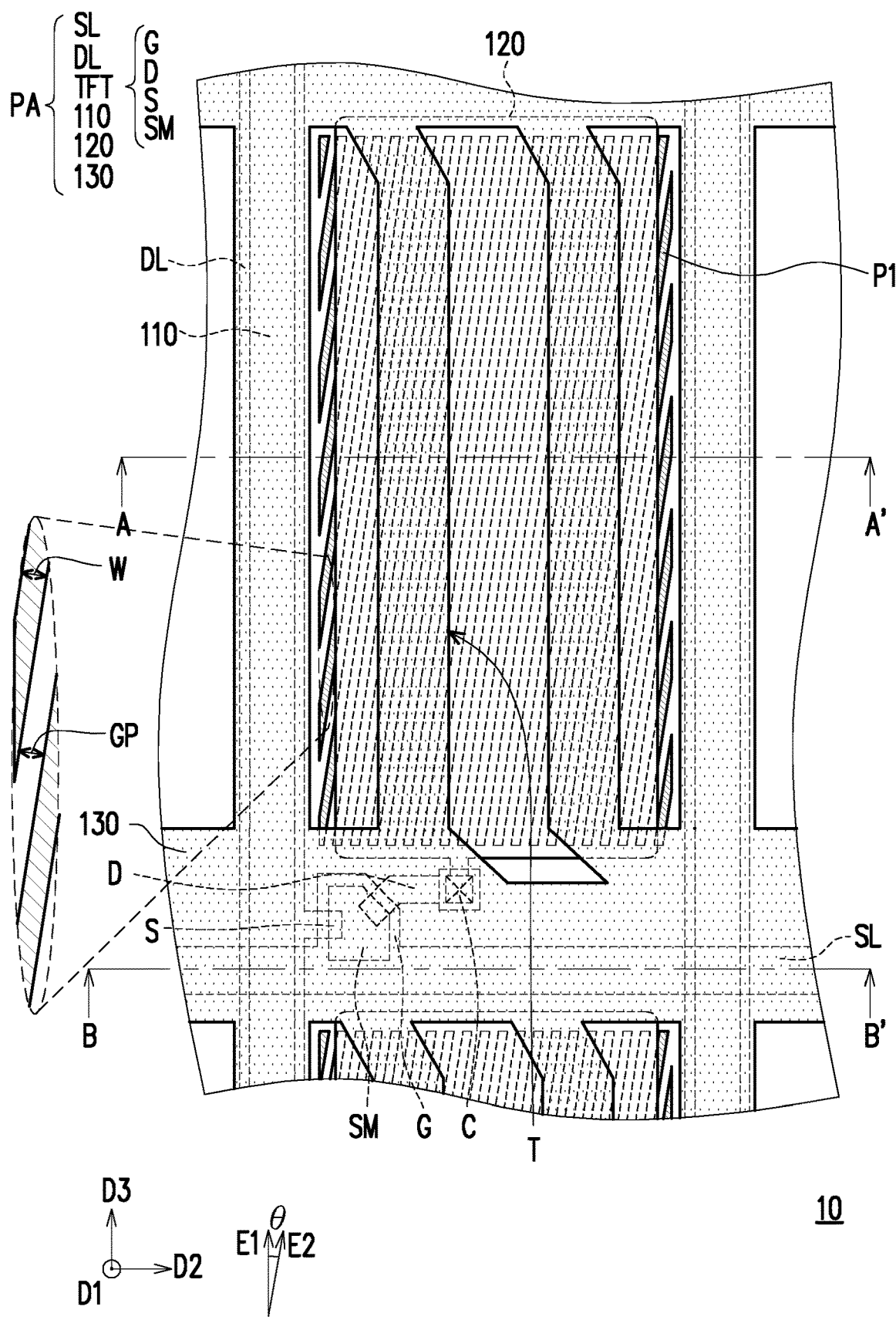
FIG. 1A is a schematic top view of a display panel according to an embodiment of the invention.

Reference will now be made in detail to the embodiments of the invention, examples of which are illustrated in the accompanying drawings. Wherever possible, the same reference numbers are used in the drawings and the description to refer to the same or similar parts.

Figure 1B:
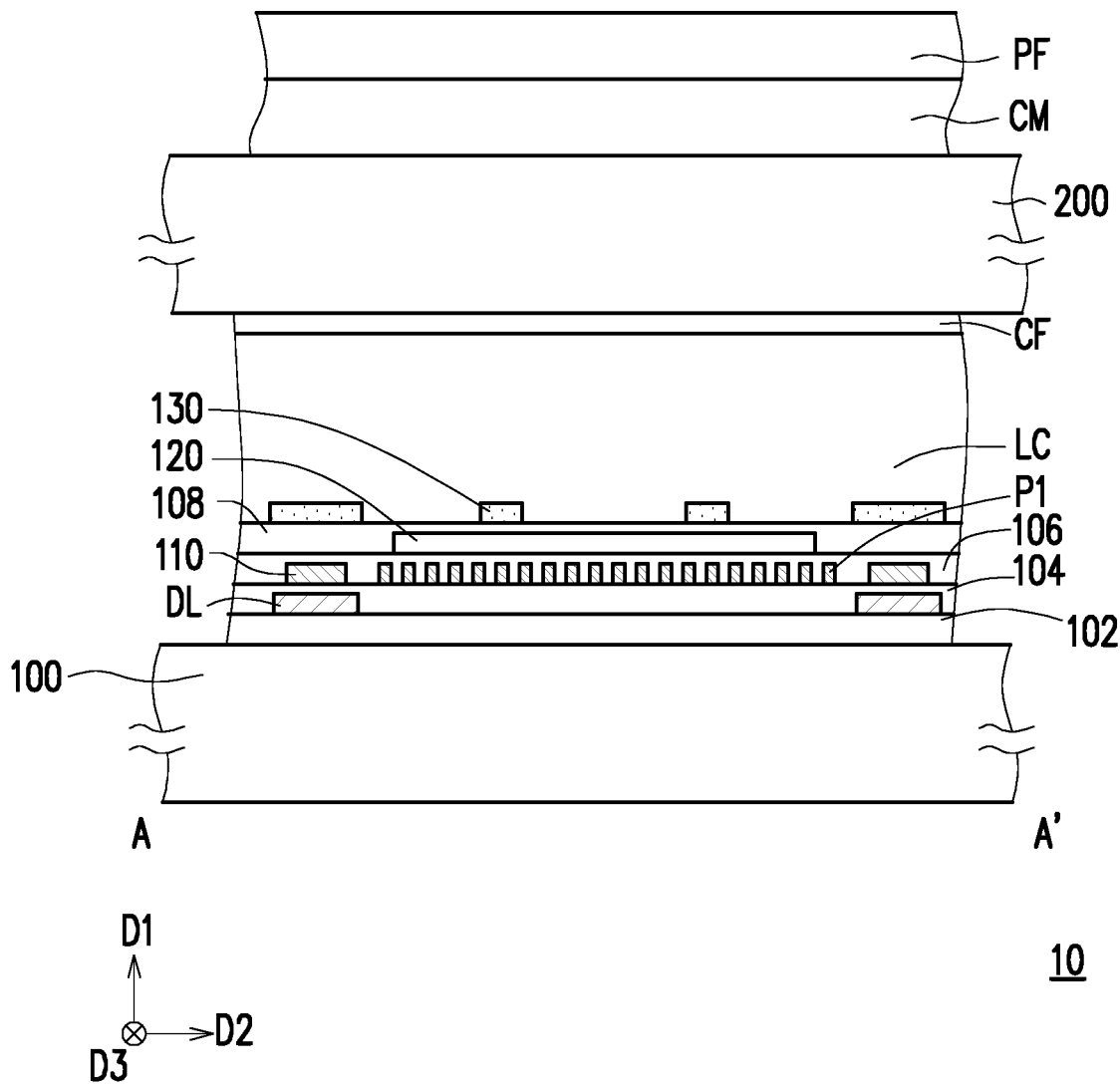
FIG. 1B is a schematic cross-sectional view taken along a section line AA' in FIG. 1A.
Figure 1C:
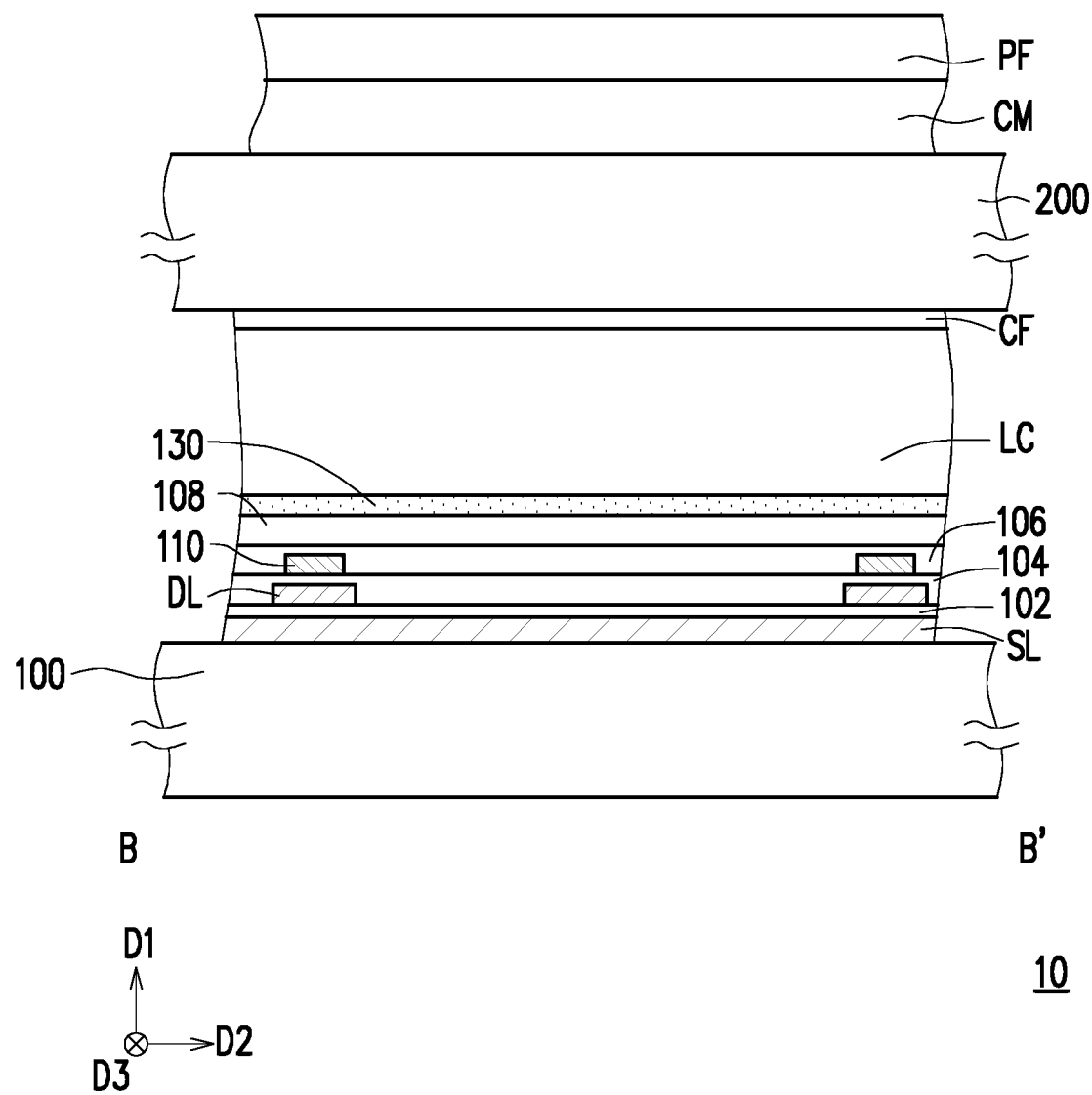
FIG. 1C is a schematic cross-sectional view taken along the section line AA' in FIG. 1A.

FIG. 1A is a schematic top view of a display panel according to an embodiment of the invention. FIG. 1B is a schematic cross-sectional view taken along a section line AA' in FIG. 1A. FIG. 1C is a schematic cross-sectional view taken along the section line AA' in FIG. 1A. It should be noted that the number and the size of striped patterns of first polarized patterns P1 depicted in FIG. 1A to FIG. 1C are simply illustrative and do not serve to limit the number and the size of the striped patterns provided in the invention.

Referring to FIG. 1A to FIG. 1C, a display panel 10 includes a substrate 100, an opposite substrate 200, a liquid crystal layer LC, a pixel array PA, and first polarized patterns P1.

A material of the substrate 100 may be glass, quartz, organic polymer, or other appropriate materials. The opposite substrate 200 is opposite to the substrate 100. The liquid crystal layer LC is disposed between the substrate 100 and the opposite substrate 200. The pixel array PA is disposed between the substrate 100 and the liquid crystal layer LC.

The pixel array PA includes a plurality of scan lines SL, a plurality of data lines DL, a plurality of active devices TFT, a plurality of first electrodes 130, and a plurality of second electrodes 120.

The scan lines SL are located on the substrate 100. The data lines DL are located above the scan lines SL, and the data lines DL and the scan lines SL are staggered. In one embodiment, an insulating layer 102 is sandwiched between the scan lines SL and the data lines DL. In one embodiment, the extending direction D2 of the scan lines SL is substantially perpendicular to the extending direction D3 of the data lines DL, but the invention is not limited thereto. In other embodiments, an acute angle or an obtuse angle is included between the extending direction D2 of the scan lines SL and the extending direction D3 of the data lines DL.

Each active device TFT includes a gate G, a semiconductor layer SM, a source S, and a drain D. The gate G is electrically connected to the scan line SL. The semiconductor layer SM is located above the gate G and separated from the gate G by an insulating layer. The source S and the drain D are disposed on the semiconductor layer SM. The source S is electrically connected to the data line DL. In the embodiment, the active devices TFT are bottom gate thin film transistors, but the invention is not limited thereto. In other embodiments, the active devices TFT may be top gate thin film transistors or other types of switch devices.

In the embodiment, the pixel array PA further includes a plurality of first auxiliary electrodes 110 disposed above the data lines DL. The first auxiliary electrodes 110 and the data lines DL are separated from each other. In one embodiment, an insulating layer 104 is sandwiched between the first auxiliary electrodes 110 and the data lines DL. In one embodiment, an extending direction of the first auxiliary electrodes 110 is equal to the extending direction D3 of the data lines DL, but the invention is not limited thereto. In other embodiments, an included angle is between the extending direction of the first auxiliary electrodes 110 and the extending direction D3 of the data lines DL. Although the pixel array PA provided in the embodiment includes the first auxiliary electrodes 110, it does not indicate that the first auxiliary electrodes 110 provided in the invention have to be included in the pixel array PA. In some embodiments, it is possible that the pixel array PA does not include the first auxiliary electrodes 110 and the insulating layer 104. In some embodiments, the first auxiliary electrodes 110 serve as touch electrodes.

The first electrodes 130 and the second electrodes 120 are located on the substrate 100. The second electrodes 120 are located between the first electrodes 130 and the substrate 100 or located between the first electrodes 130 and the liquid crystal layer LC. In the embodiment, the second electrodes 120 are located between the first electrodes 130 and the substrate 100. An insulating layer 108 is sandwiched between the first electrodes 130 and the second electrodes 120. An insulating layer 106 is sandwiched between the second electrodes 120 and the first auxiliary electrodes 110. In the embodiment, the second electrodes 120 are pixel electrodes, and the second electrodes 120 are electrically connected to the drains D of active devices TFT through contact windows C, but the invention is not limited thereto. In other embodiments, the insulating layer 106 is sandwiched between the first electrodes 130 and the first auxiliary electrodes 110, and the insulating layer 108 is sandwiched between the first electrodes 130 and the second electrodes 120; that is, the second electrodes 120 are disposed above the first electrodes 130, and the second electrodes 120 are electrically connected to the drains D of active devices TFT. In the embodiment, the first electrodes 130 are common electrodes, and the first electrodes 130 include a plurality of slits T. The slits T overlap with the second electrodes 120, but the invention is not limited thereto. In other embodiments, the second electrodes 120 serving as the pixel electrodes include a plurality of slits T. In the embodiment, an extending direction E1 of the slits T in a pixel region is, for example, equal to the extending direction D3 of the data lines DL, wherein the pixel region, for example, corresponds to the location of the pixel electrodes and approximately overlaps with the pixel electrodes, but the invention is not limited thereto. In other embodiments, an acute angle or an obtuse angle is included between the extending direction of the slits T in the pixel region and the extending direction D3 of the data lines DL. In one embodiment, the slits T may have another extending direction different from the extending direction E1 at a position close to the scan lines SL, and said extending direction at the position of the slits T close to the scan lines SL may further facilitate the liquid crystal alignment. In one embodiment, a portion of the first electrodes 130 is disposed above and overlaps with the data lines DL, and the portion of the first electrodes 130 has the same extending direction as that of the data lines DL.

The first polarized patterns P1 in a direction D1 perpendicular to the substrate 100 overlap with the second electrodes 120 and partially overlap with the first electrodes 130. The first polarized patterns P1 are disposed between the substrate 100 and the opposite substrate 200. In the embodiment, the first polarized patterns P1 are disposed between the substrate 100 and the liquid crystal layer LC, and a color filter device CF is disposed between the liquid crystal layer LC and the opposite substrate 200. A polarizing film PF and an optical compensation film CM are provided on another side of the opposite substrate 200 opposite to the color filter device CF, wherein the optical compensation film CM is disposed between the polarizing film PF and the opposite substrate 200, but the invention is not limited thereto. In other embodiments, the first polarized patterns P1 are disposed between the color filter device CF and the liquid crystal layer LC or between the color filter device CF and the opposite substrate 200, and the polarizing film PF and the optical compensation film CM are disposed on another side of the substrate 100 opposite to the pixel array PA, such as the outer side of the substrate 100, wherein the optical compensation film CM is disposed between the polarizing film PF and the substrate 100. In one embodiment, the polarizing film PF is disposed on the substrate 100 or the opposite substrate 200 where no first polarized patterns P1 are disposed, and the optical compensation film CM is disposed between the polarizing film PF and the substrate 100 or the opposite substrate 200.

In one embodiment, the first polarized patterns P1 and the first auxiliary electrodes 110 belong to the same film layer and are separated from each other. In one embodiment, the first polarized patterns P1 and the first auxiliary electrodes 110 are, for example, separated by an insulating layer, so that there is no short circuit between the first polarized patterns P1 and the first auxiliary electrodes 110. In one embodiment, the first polarized patterns P1 and the first auxiliary electrodes 110 are simultaneously formed, for example, by performing a nano-imprint process, such that no additional process for manufacturing the first polarized patterns P1 is required, and the manufacturing costs are reduced.

In one embodiment, each of the first polarized patterns P1 is composed of a plurality of striped patterns in parallel, a width W of each of the striped patterns is within a range from 15 nm to 120 nm, and a gap GP between the adjacent striped patterns is within a range from 15 nm to 120 nm. The first polarized patterns P1 include a plurality of independent striped patterns extending along an extending direction E2, and the extending direction E2 of the first polarized patterns P1 is different from the extending direction E1 of the slits T.

In one embodiment, an alignment film (not illustrated) is sandwiched between the liquid crystal layer LC and the substrate 100. The alignment film has an alignment direction which is substantially parallel to or substantially perpendicular to an extending direction of polarized patterns (e.g., the extending direction E2 of the first polarized patterns P1).

In one embodiment, the liquid crystal layer LC includes positive type liquid crystal (i.e., liquid crystal with positive dielectric anisotropy), an included angle between the extending direction E2 of the first polarized patterns P1 and the extending direction E1 of the slits T is $\theta$ degree, $-15 \le \theta \le 15$, and $\theta \ne 0$. In one embodiment, an included angle between the extending direction E2 of the first polarized patterns P1 and the extending direction E1 of the slits T is $\theta$ degree, $-15 \le \theta \le -2$ or $2 \le \theta \le 15$, and in some preferred embodiments, $-15 \le \theta \le -5$ or $5 \le \theta \le 15$. In one embodiment, the extending direction of the first auxiliary electrodes 110 is, for example, equal to the extending direction D3 of the data lines DL, and an included angle between the extending direction E2 of the first polarized patterns P1 and the extending direction of the first auxiliary electrodes 110 is less than 45 degrees.

In one embodiment, the liquid crystal layer LC includes negative type liquid crystal (i.e., liquid crystal with negative dielectric anisotropy), an included angle between the extending direction E2 of the first polarized patterns P1 and the extending direction E1 of the slits T is $\theta$ degree, $75 \le \theta \le 105$, and $\theta \ne 90$. In one embodiment, an included angle between the extending direction E2 of the first polarized patterns P1 and the extending direction E1 of the slits T is $\theta$ degree, $75 \le \theta \le 88$ or $92 \le \theta \le 105$, and in some preferred embodiments, $75 \le \theta \le 85$ or $95 \le \theta \le 105$. In one embodiment, the extending direction of the first auxiliary electrodes 110 is, for example, equal to the extending direction D2 of the scan lines SL, and an included angle between the extending direction E2 of the first polarized patterns P1 and an extending direction of the first auxiliary electrodes 110 is less than 45 degrees.

In one embodiment, the first polarized patterns P1 and the first auxiliary electrodes 110 are simultaneously formed, for example, by performing a nano-imprint process. In the nano-imprint process, the photomask patterns are transferred and printed by applying a physical contact method; hence, a problem of a film separation is easily generated after imprinting. In some embodiments, an included angle between the extending direction E2 of the first polarized patterns P1 and the extending direction of the first auxiliary electrodes 110 is less than 45 degrees, and a direction of the film separation during separating the film may be as close as possible to the extending direction E2 of the first polarized patterns P1 and/or the extending direction of the first auxiliary electrodes 110, such that the overall yield of the nano-imprint process may increase.

Based on the above, in the display panel 10 provided in the invention, the first polarized patterns P1 and the first auxiliary electrodes 110 belong to the same film layer. Therefore, it is not required to form any additional polarizing film at the outer side of the substrate 100, and the manufacturing costs of the display panel 10 may be reduced while the yield of the display panel 10 is increased. In addition, the extending direction E2 of the first polarized patterns P1 provided in the invention is different from the extending direction E1 of the slits T in the pixel array PA. Owing to the alignment achieved by the alignment film, the display panel 10 may accomplish better polarizing effects, and the liquid crystal efficiency may be enhanced.

Figure 2A:
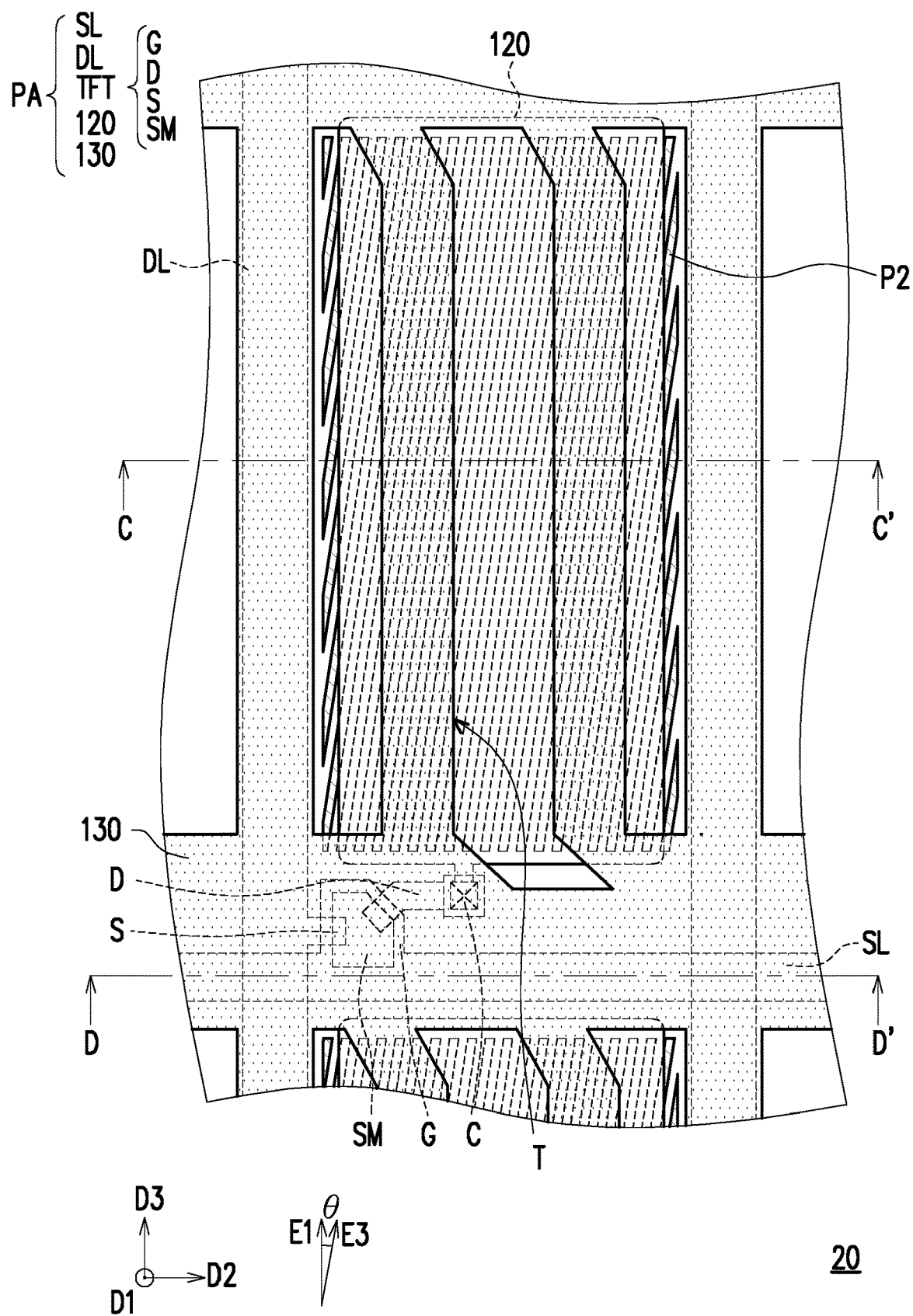
FIG. 2A is a schematic top view of a display panel according to another embodiment of the invention.
Figure 2B:
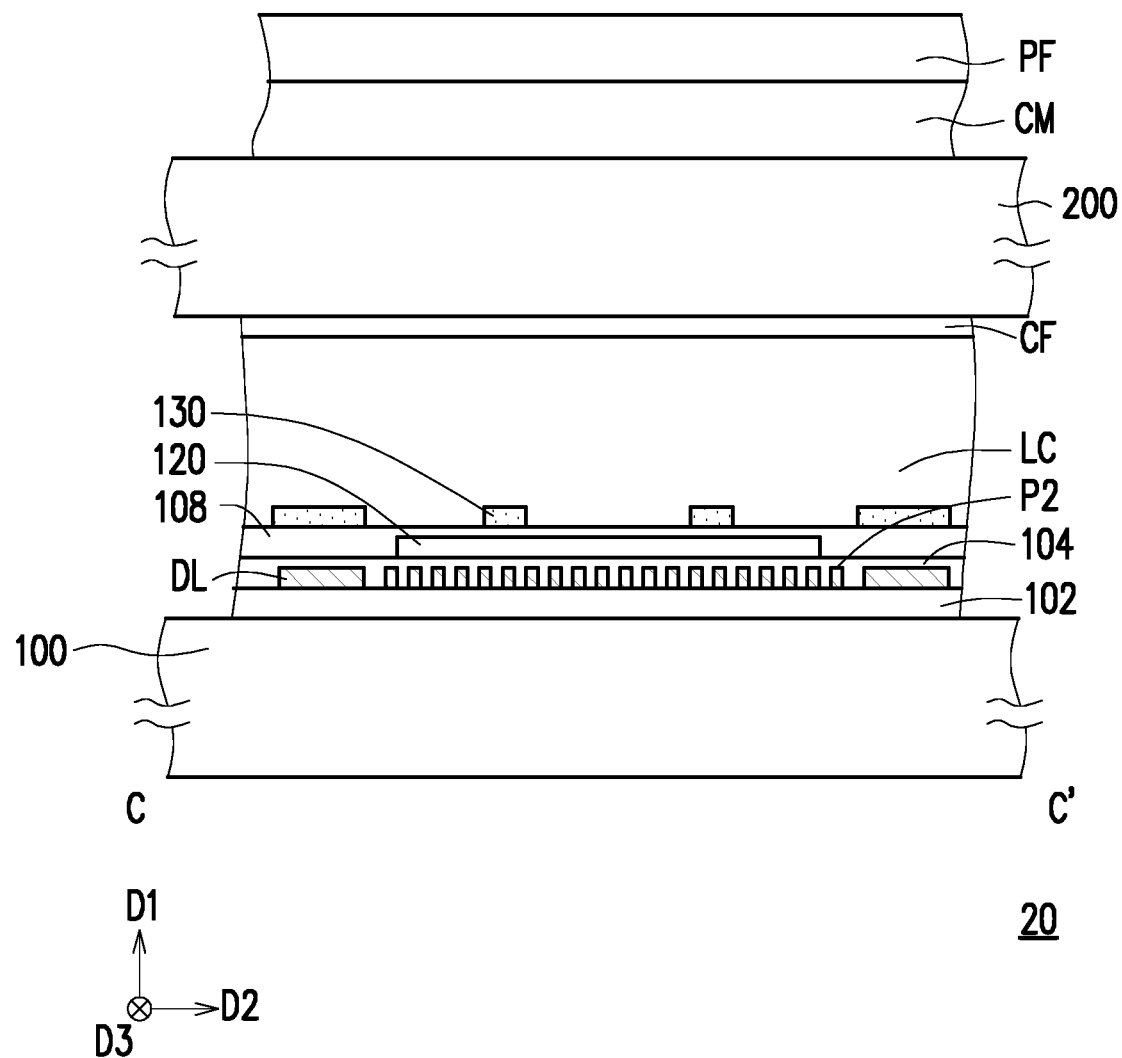
FIG. 2B is a schematic cross-sectional view taken along a section line CC' in FIG. 2A.
Figure 2C:
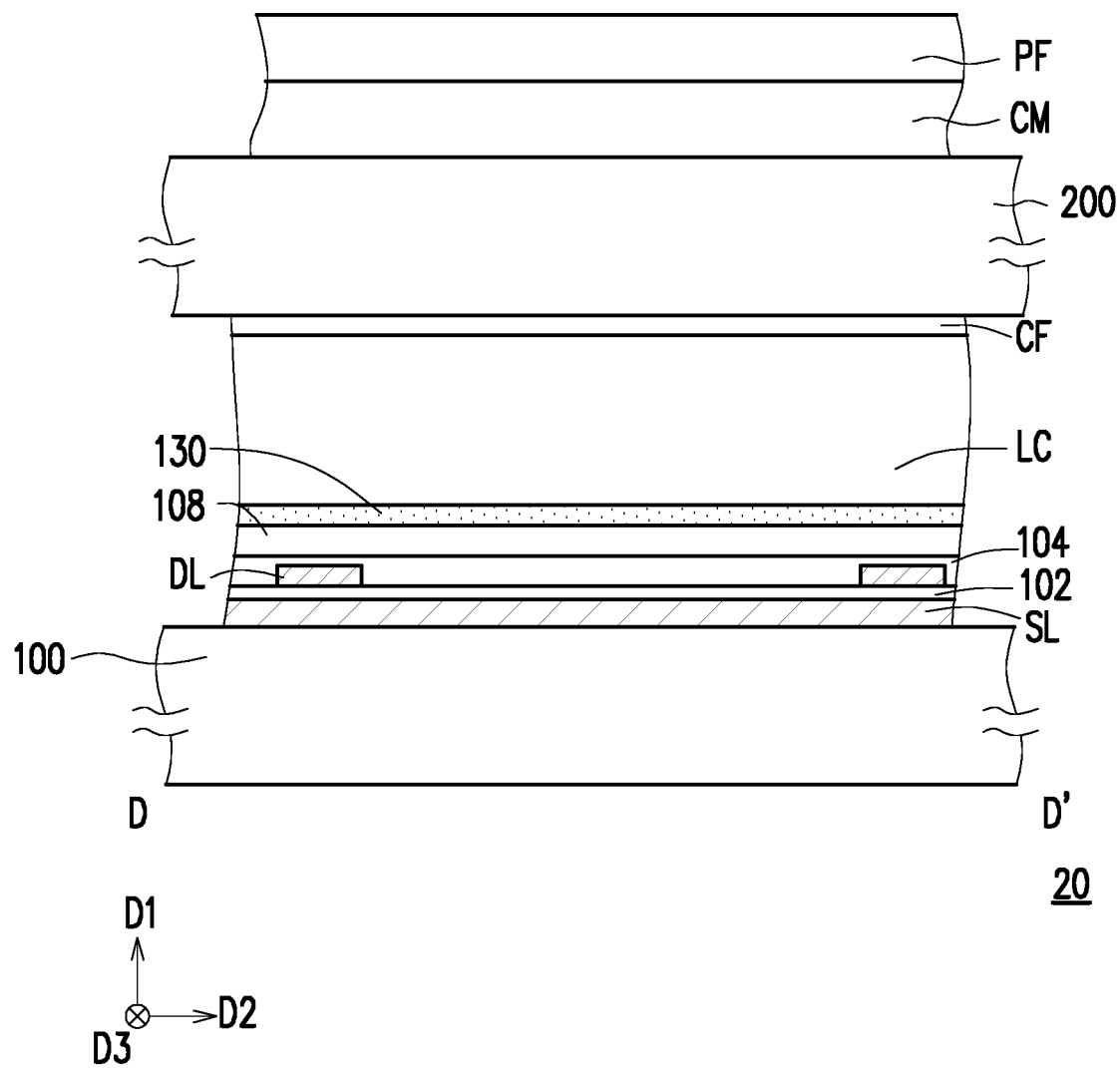
FIG. 2C a schematic cross-sectional view taken along a section line DD' in FIG. 2A.

FIG. 2A is a schematic top view of a display panel according to another embodiment of the invention. FIG. 2B is a schematic cross-sectional view taken along a section line CC' in FIG. 2A. FIG. 2C a schematic cross-sectional view taken along a section line DD' in FIG. 2A. It should be noted that the number and the size of striped patterns of first polarized patterns P2 depicted in FIG. 2A to FIG. 2C are simply illustrative and do not serve to limit the number and the size of striped patterns provided in the invention. Here, it should be noted that the reference numbers of components and partial content of the embodiments depicted in FIG. 1A to FIG. 1C are adopted in the embodiments depicted in FIG. 2A to FIG. 2C, wherein identical or similar reference numbers indicate identical or similar components, and descriptions of the same techniques are omitted. The omitted descriptions may be found in the above embodiments and will not be repeated in the following embodiments.

The main difference between the embodiment depicted in FIG. 2A to FIG. 2C and the embodiment depicted in FIG. 1A to FIG. 1C lies in that the first polarized patterns P1 shown in FIG. 1A to FIG. 1C and the first auxiliary electrodes 110 belong to the same film layer, while the first polarized patterns P2 shown in FIG. 2A to FIG. 2C and the data lines DL belong to the same film layer.

In the embodiment, a display panel 20 includes a substrate 100, an opposite substrate 200, a liquid crystal layer LC, a pixel array PA, and first polarized patterns P2. The opposite substrate 200 is opposite to the substrate 100. The liquid crystal layer LC is located between the substrate 100 and the opposite substrate 200. The pixel array PA is located between the substrate 100 and the liquid crystal layer LC. The pixel array PA includes a plurality of scan lines SL, a plurality of data lines DL, a plurality of active devices TFT, a plurality of first electrodes 130, and a plurality of second electrodes 120. The data lines DL and the scan lines SL are staggered. The active devices TFT are electrically connected to the scan lines SL and the data lines DL. The second electrodes 120 are electrically connected to the active devices TFT. The first electrodes 130 are located on the substrate 100. Each of the first electrodes 130 includes a plurality of slits T. The first polarized patterns P2 in a direction D1 perpendicular to the substrate 100 overlap with the second electrodes 120 and partially overlap with the first electrodes 130. The first polarized patterns P2 are located between the substrate 100 and the opposite substrate 200. The extending direction E3 of the first polarized patterns P2 is different from the extending direction E1 of the slits T.

In the embodiment, the first polarized patterns P2 and the data lines DL belong to the same film layer and are separated from each other, and an included angle between the extending direction E3 of the first polarized patterns P2 and the extending direction D3 of the data lines DL is less than 45 degrees.

In one embodiment, the first polarized patterns P2 and the data lines DL are simultaneously formed by, for example, performing an etching and photolithography process or the nano-imprint process, such that no additional process for manufacturing the first polarized patterns P2 is required. In the nano-imprint process, the photomask patterns are transferred and printed by applying a physical contact method; hence, a problem of a film separation is easily generated after imprinting. In some embodiments, an included angle between the extending direction E3 of the first polarized patterns P2 and the extending direction D3 of the data lines DL is less than 45 degrees, and a direction of the film separation during separating the film may be as close as possible to the extending direction E3 of the first polarized patterns P2 and/or the extending direction D3 of the data lines DL, such that the overall yield of the nano-imprint process may increase.

Based on the above, in the display panel 20 provided in the invention, the first polarized patterns P2 and the data lines DL belong to the same film layer. Therefore, it is not required to form any additional polarizing film at the outer side of the substrate 100, and the manufacturing costs of the display panel 20 may be reduced while the yield of the display panel 20 is increased. In addition, the extending direction E3 of the first polarized patterns P2 provided in the invention is different from the extending direction E1 of the slits T of the first electrodes 130 in the pixel array PA. Owing to the alignment achieved by the alignment film, the display panel 20 may accomplish better polarizing effects, and the liquid crystal efficiency may be enhanced.

Figure 3A:
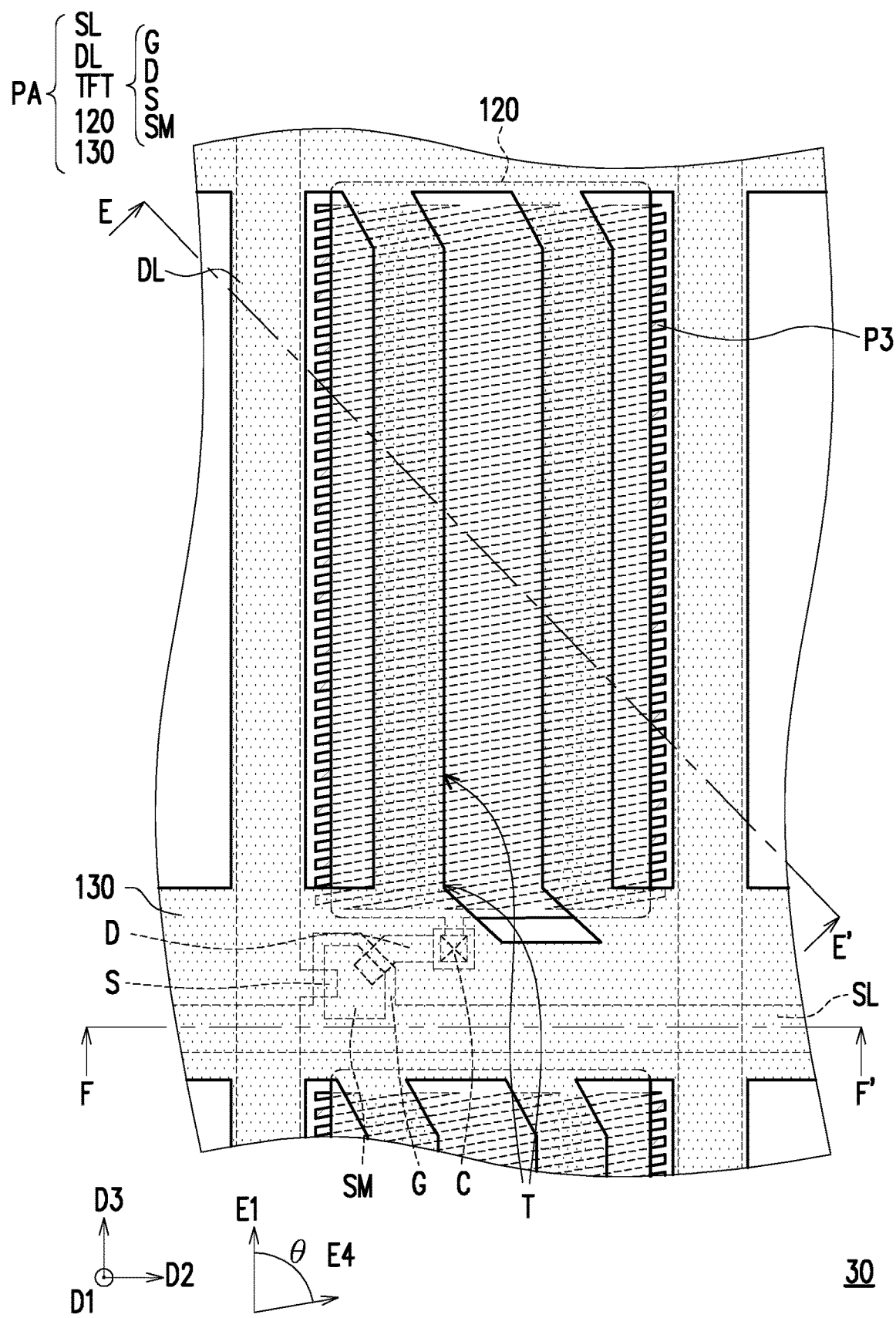
FIG. 3A is a schematic top view of a display panel according to still another embodiment of the invention.
Figure 3B:
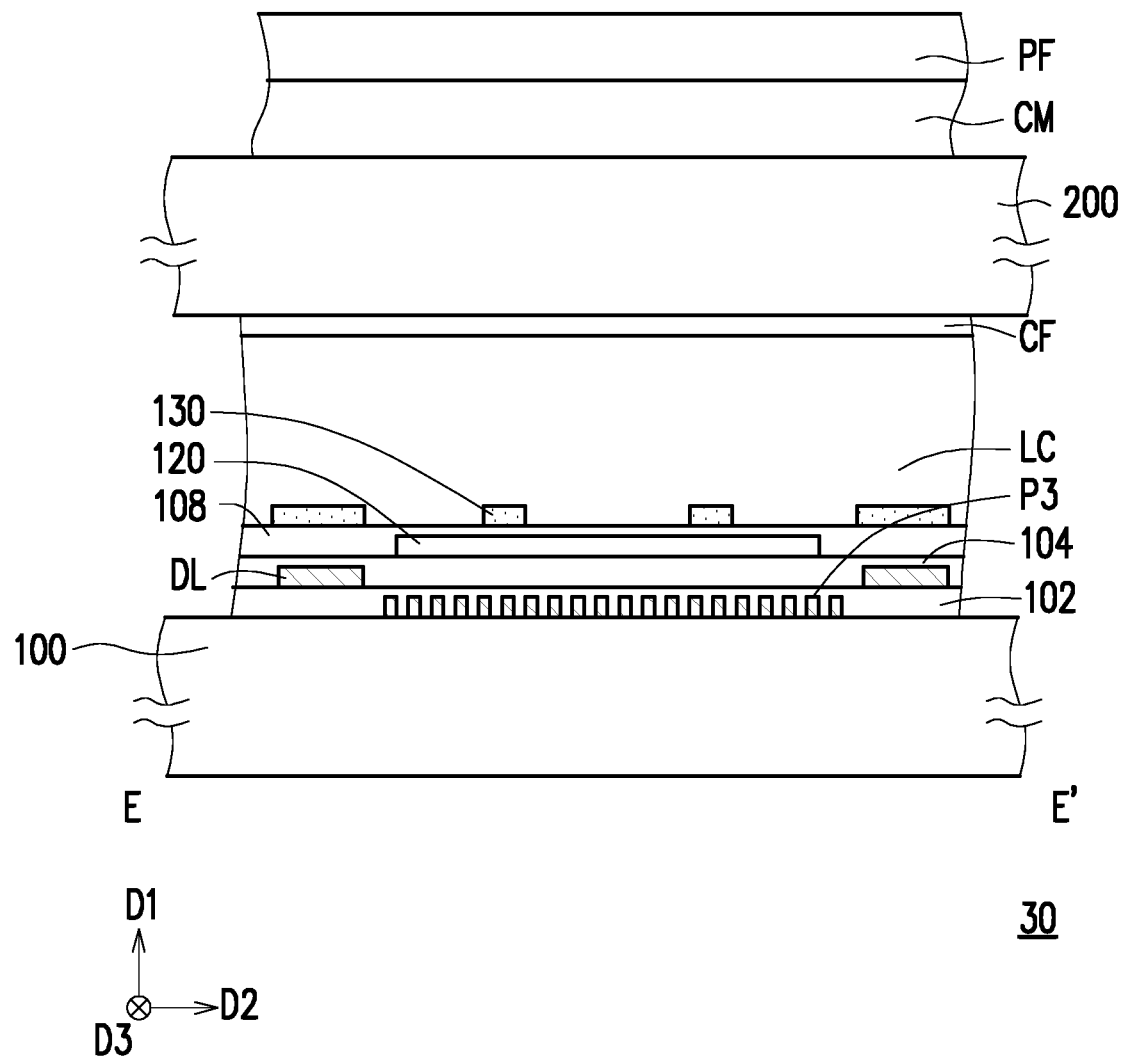
FIG. 3B is a schematic cross-sectional view taken along a section line EE' in FIG. 2A.
Figure 3C:
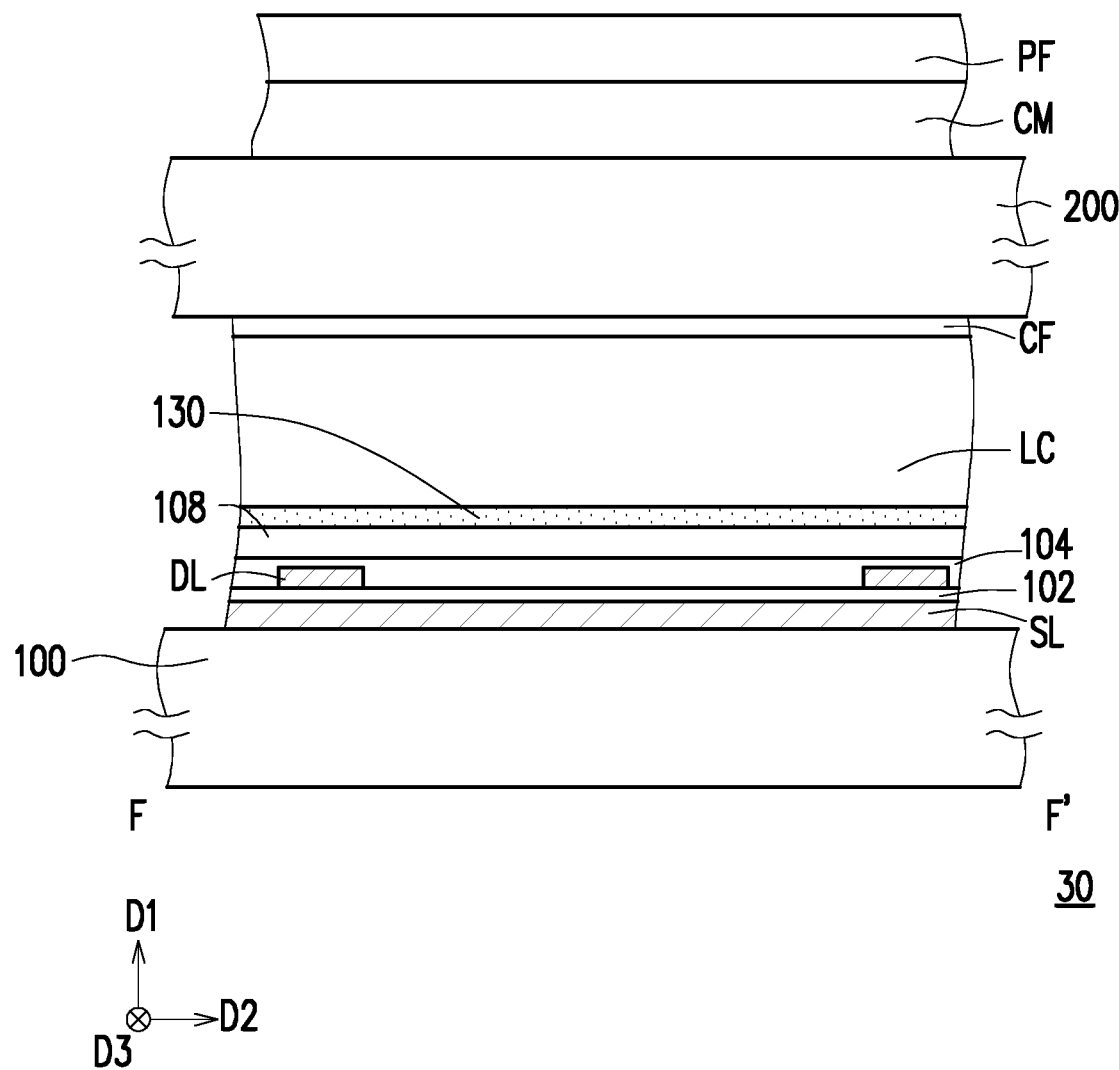
FIG. 3C a schematic cross-sectional view taken along a section line FF' in FIG. 2A.

FIG. 3A is a schematic top view of a display panel according to another embodiment of the invention. FIG. 3B is a schematic cross-sectional view taken along a section line EE' in FIG. 3A. FIG. 3C a schematic cross-sectional view taken along a section line FF' in FIG. 3A. It should be noted that the number and the size of striped patterns of the first polarized patterns P3 depicted in FIG. 3A to FIG. 3C are simply illustrative and do not serve to limit the number and the size of striped patterns provided in the invention.

Here, it should be mentioned that the reference numbers of components and partial content of the embodiments depicted in FIG. 1A to FIG. 1C are adopted in the embodiments depicted in FIG. 3A and FIG. 3B, wherein identical or similar reference numbers indicate identical or similar components, and descriptions of the same techniques are omitted. The omitted descriptions may be found in the above embodiments and will not be repeated in the following embodiments.

The main difference between the embodiment depicted in FIG. 3A to FIG. 3C and the embodiment depicted in FIG. 1A to FIG. 1C lies in that the first polarized patterns P1 shown in FIG. 1A to FIG. 1C and the first auxiliary electrodes 110 belong to the same film layer, while the first polarized patterns P3 shown in FIG. 3A to FIG. 3C and the scan lines SL belong to the same film layer.

In the embodiment, a display panel 30 includes a substrate 100, an opposite substrate 200, a liquid crystal layer LC, a pixel array PA, and first polarized patterns P3. The opposite substrate 200 is opposite to the substrate 100. The liquid crystal layer LC is located between the substrate 100 and the opposite substrate 200. The pixel array PA is located between the substrate 100 and the liquid crystal layer LC. The pixel array PA includes a plurality of scan lines SL, a plurality of data lines DL, a plurality of active devices TFT, a plurality of first electrodes 130, and a plurality of second electrodes 120. The data lines DL and the scan lines SL are staggered. The active devices TFT are electrically connected to the scan lines SL and the data lines DL. The second electrodes 120 are electrically connected to the active devices TFT. The first electrodes 130 are located on the substrate 100. Each of the first electrodes 130 includes a plurality of slits T. The first polarized patterns P3 in a direction D1 perpendicular to the substrate 100 overlap with the second electrodes 120 and partially overlap with the first electrodes 130. The first polarized patterns P3 are located between the substrate 100 and the opposite substrate 200. The extending direction E4 of the first polarized patterns P3 is different from the extending direction E1 of the slits T.

In an embodiment, the liquid crystal layer LC includes negative type liquid crystal, an included angle between an extending direction E4 of the first polarized patterns P3 and an extending direction E1 of the slits T is θ degree, 75≤θ≤105, and θ≠90. In an embodiment, an included angle between the extending direction E4 of the first polarized patterns P3 and the extending direction E1 of the slits T is θ degree, 75≤θ≤88 or 92≤θ≤105, and in some preferred embodiments, 75≤θ≤85 or 95≤θ≤105.

In the embodiment, the first polarized patterns P3 and the scan lines SL belong to the same film layer and are separated from each other, and an included angle between the extending direction E4 of the first polarized patterns P3 and the extending direction D2 of the scan lines SL is less than 45 degrees.

In one embodiment, the first polarized patterns P3 and the scan lines SL are simultaneously formed by, for example, performing an etching and photolithography process or the nano-imprint process, such that no additional process for manufacturing the first polarized patterns P3 is required. In the nano-imprint process, the photomask patterns transferred and printed by applying the physical contact method; hence, a problem of a film separation is easily generated after imprinting. In some embodiments, an included angle between the extending direction E4 of the first polarized patterns P3 and the extending direction D2 of the scan lines SL is less than 45 degrees, and a direction of the film separation during separating the film may be as close as possible to the extending direction E4 of the first polarized patterns P3 and/or the extending direction D2 of the scan lines SL, such that the overall yield of the nano-imprint process may increase.

Based on the above, in the display panel 30 provided in the invention, the first polarized patterns P3 and the scan lines SL belong to the same film layer. Therefore, it is not required to form any additional polarizing film at the outer side of the substrate 100, and the manufacturing costs of the display panel 30 may be reduced while the yield of the display panel 30 is increased. In addition, the extending direction E4 of the first polarized patterns P3 provided in the invention is different from the extending direction E1 of the slits T of the first electrodes 130 in the pixel array PA. Owing to the alignment of the alignment film, the display panel 30 may achieve better polarizing effects, and the liquid crystal efficiency may be enhanced.

Figure 4A:
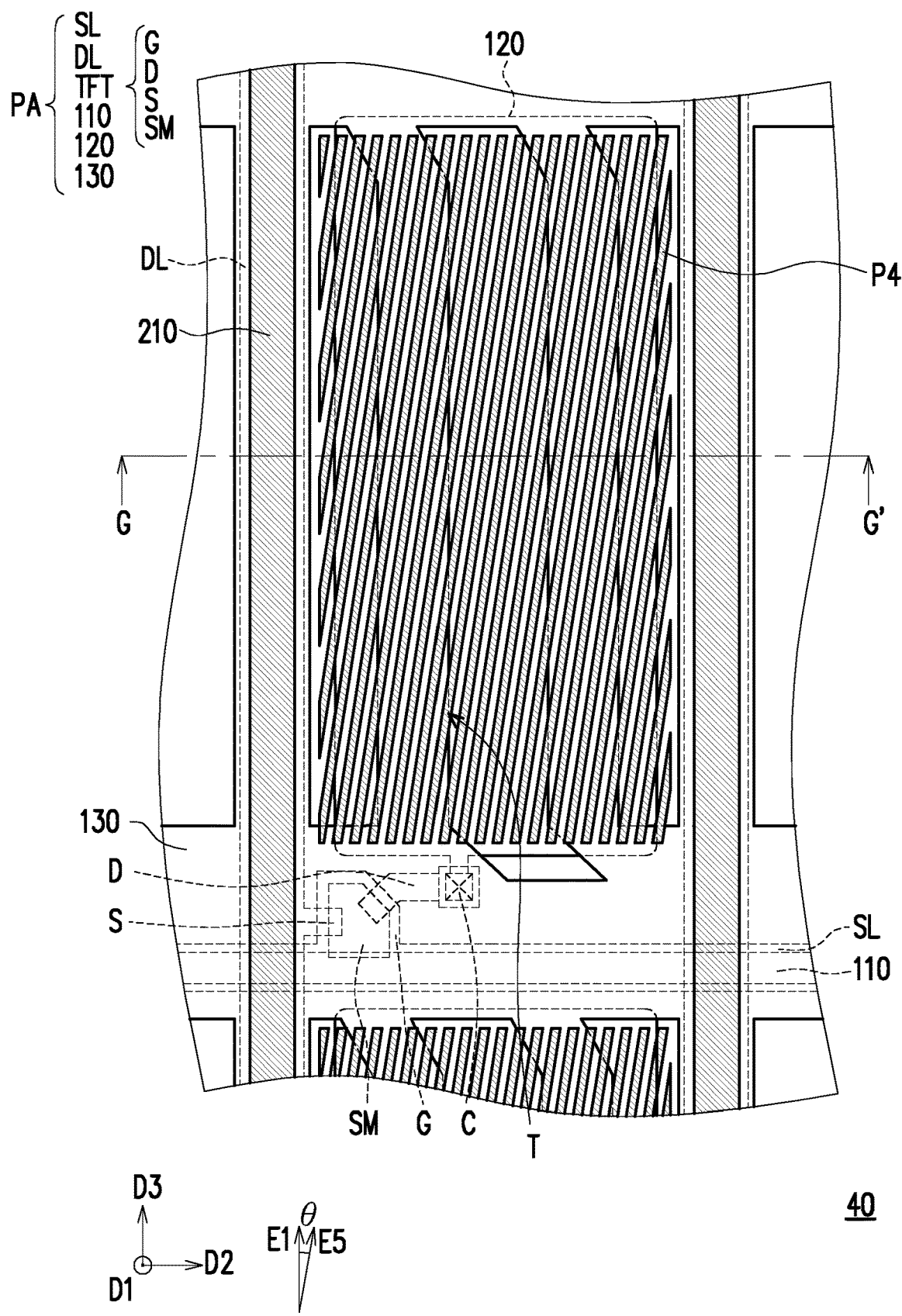
FIG. 4A is a schematic top view of a display panel according to still another embodiment of the invention.
Figure 4B:
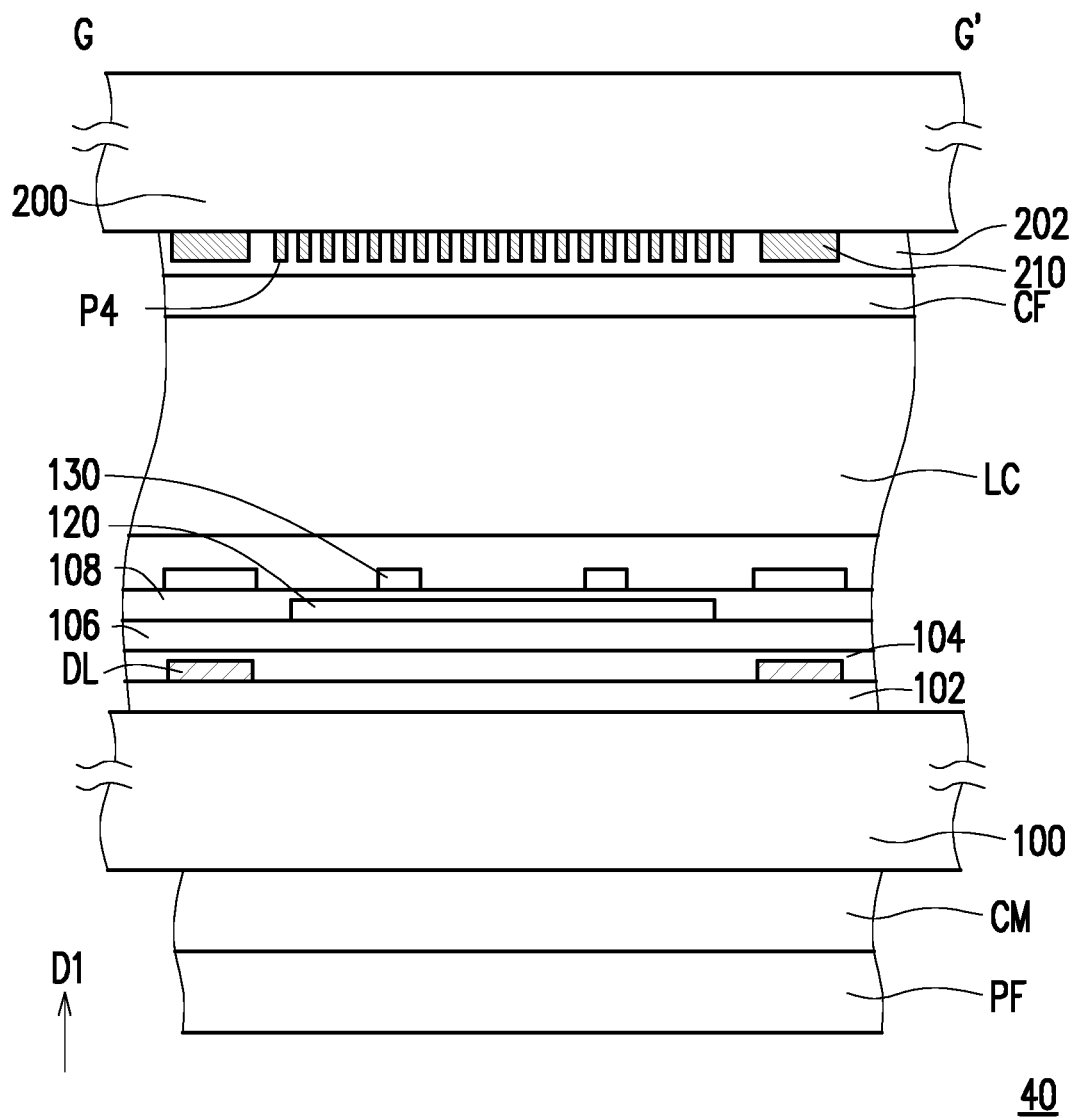
FIG. 4B is a schematic cross-sectional view taken along a section line GG' in FIG. 4A.

FIG. 4A is a schematic cross-sectional view of a display panel according to yet another embodiment of the invention. FIG. 4B is a schematic cross-sectional view taken along a section line GG' in FIG. 4A. It should be noted that the number and the size of striped patterns of the first polarized patterns P4 depicted in FIG. 4A and FIG. 4B are simply illustrative and do not serve to limit the number and the size of striped patterns provided in the invention.

Here, it should be mentioned that the reference numbers of components and partial content of the embodiments depicted in FIG. 1A to FIG. 1C are adopted in the embodiments depicted in FIG. 4A and FIG. 4B, wherein identical or similar reference numbers indicate identical or similar components, and descriptions of the same techniques are omitted. The omitted descriptions may be found in the above embodiments and will not be repeated in the following embodiments.

The main difference between the embodiment depicted in FIG. 4A and FIG. 4B and the embodiment depicted in FIG. 1A to FIG. 1C lies in that the first polarized patterns P1 in FIG. 1A to FIG. 1C are located between the liquid crystal layer and the substrate 100, while the first polarized patterns P4 in FIG. 4A and FIG. 4B are located between the liquid crystal layer LC and the opposite substrate 200.

In the embodiment, a display panel 40 includes a substrate 100, an opposite substrate 200, a liquid crystal layer LC, a pixel array PA, and first polarized patterns P4. The opposite substrate 200 is opposite to the substrate 100. The liquid crystal layer LC is located between the substrate 100 and the opposite substrate 200. The pixel array PA is located between the substrate 100 and the liquid crystal layer LC. The pixel array PA includes a plurality of scan lines SL, a plurality of data lines DL, a plurality of active devices TFT, a plurality of first electrodes 130, and a plurality of second electrodes 120. The data lines DL and the scan lines SL are staggered. The active devices TFT are electrically connected to the scan lines SL and the data lines DL. The second electrodes 120 are electrically connected to the active devices TFT. The first electrodes 130 are located on the substrate 100. Each of the first electrodes 130 includes a plurality of slits T.

The first polarized patterns P4 in a direction D1 perpendicular to the substrate 100 overlap with the second electrodes 120 and partially overlap with the first electrodes 130. The first polarized patterns P4 are disposed between the liquid crystal layer LC and the opposite substrate 200. The extending direction E5 of the first polarized patterns P4 is different from the extending direction E1 of the slits T. An included angle between the extending direction E5 of the first polarized patterns P4 and the extending direction E1 of the slits T is θ degree, and the value of θ is preferably the value described in the above embodiments.

Plural second auxiliary electrodes 210 are located on the opposite substrate 200. In an embodiment, an extending direction of the second auxiliary electrodes 210 is identical to the extending direction D3 of the data lines DL, but the invention is not limited thereto. In other embodiments, the extending direction of the second auxiliary electrodes 210 is identical to the extending direction D2 of the scan lines SL. In the embodiment, the first polarized patterns P4 and the second auxiliary electrodes 210 belong to the same film layer, and an included angle between the extending direction E5 of the first polarized patterns P4 and the extending direction of the second auxiliary electrodes 210 is less than 45 degrees.

In one embodiment, the pixel array PA even includes a plurality of first auxiliary electrodes 110 located above the scan lines SL. The first auxiliary electrodes 110 and the scan lines SL are separated at least by an insulating layer 102 from each other. In one embodiment, an extending direction of the first auxiliary electrodes 110 is equal to the extending direction D2 of the scan lines SL. In one embodiment, the second auxiliary electrodes 210 and the first auxiliary electrodes 110 may serve as touch electrodes. In one embodiment, the extending direction of the first auxiliary electrodes 110 is substantially perpendicular to the extending direction of the second auxiliary electrodes 210. In one embodiment, the second auxiliary electrodes 210 may serve as view-angle control signal electrodes.

In one embodiment, the second auxiliary electrodes 210 are located between the color filter device CF and the opposite substrate 200, and an insulating layer 202 is sandwiched between the second auxiliary electrodes 210 and the color filter device CF, but the invention is not limited thereto. In other embodiments, the color filter device CF is located between the second auxiliary electrodes 210 and the opposite substrate 200.

In the embodiment, the color filter device CF is disposed on the opposite substrate 200. However, the invention is not limited thereto. According to other embodiments, the color filter device CF may also be disposed on the substrate 100 to form a color filter on array (COA) structure.

In the embodiment, the optical compensation film CM is arranged at another side of the substrate 100 opposite to the pixel array PA. In one embodiment, the optical compensation film CM is located between the polarizing film PF and the substrate 100, but the invention is not limited thereto. In other embodiments, no polarizing film PF is arranged on the substrate 100, and plural second polarized patterns are provided between the substrate 100 and the liquid crystal layer LC. In one embodiment, the second polarized patterns and the scan lines, the data lines, or the first auxiliary electrodes belong to the same film layer and are, for example, simultaneously formed together with the scan lines, the data lines, or the first auxiliary electrodes by performing the nano-imprint process. In one embodiment, the second polarized patterns are located on the substrate 100 or the opposite substrate 200 where no first polarized pattern is located, and the second polarized patterns overlap with the first polarized patterns P4 in a direction D1 perpendicular to the substrate 100. In one embodiment, the extending direction of the second polarized patterns is perpendicular to the extending direction of the first polarized patterns P4.

Based on the above, in the display panel 40 provided in the invention, the first polarized patterns P4 and the second auxiliary electrodes 210 belong to the same film layer. Therefore, it is not required to form any additional polarizing film at the outer side of the opposite substrate 200, and the manufacturing costs of the display panel 40 may be reduced while the yield of the display panel 40 is increased. In addition, the extending direction of the first polarized patterns P4 provided in the invention is different from the extending direction of the slits of the first electrodes in the pixel array. Owing to the alignment achieved by the alignment film, the display panel 40 may accomplish better polarizing effects, and the liquid crystal efficiency may be enhanced.

Figure 5:
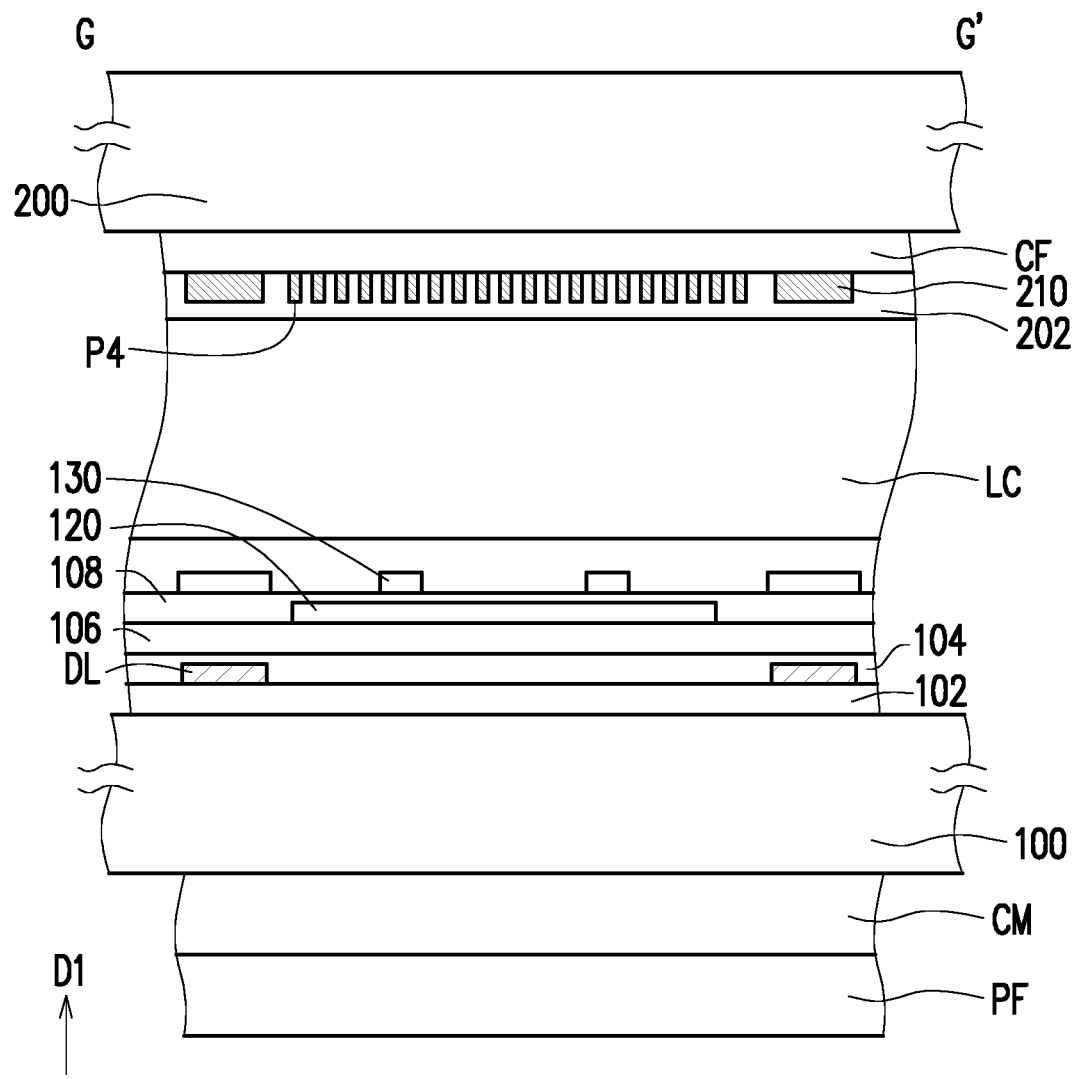
FIG. 5 is a schematic top view of a display panel according to still another embodiment of the invention.

FIG. 5 is a schematic cross-sectional view of a display panel according to yet another embodiment of the invention. It should be noted that the number and the size of striped patterns of the first polarized patterns P4 depicted in FIG. 5 are simply illustrative and do not serve to limit the number and the size of striped patterns provided in the invention.

Here, it should be mentioned that the reference numbers of components and partial content of the embodiments depicted in FIG. 4A and FIG. 4B are adopted in the embodiments depicted in FIG. 5, wherein identical or similar reference numbers indicate identical or similar components, and descriptions of the same techniques are omitted.

The omitted descriptions may be found in the above embodiments and will not be repeated in the following embodiments.

The main difference between the embodiment depicted in FIG. 4A and FIG. 4B and the embodiment depicted in FIG. 5 lies in that the first polarized patterns P4 depicted in FIG. 4B and the second auxiliary electrodes 210 are located between the color filter device CF and the opposite substrate 200, and the first polarized patterns P4 depicted in FIG. 5 and the second auxiliary electrodes 210 are located between the liquid crystal layer LC and the color filter device CF.

In the embodiment, a display panel 50 includes a substrate 100, an opposite substrate 200, a liquid crystal layer LC, a pixel array PA, and first polarized patterns P4. The opposite substrate 200 is located opposite to the substrate 100. The liquid crystal layer LC is located between the substrate 100 and the opposite substrate 200. The pixel array PA is located between the substrate 100 and the liquid crystal layer LC. The pixel array PA includes a plurality of scan lines, a plurality of data lines DL, a plurality of active devices, a plurality of first electrodes 130, and a plurality of second electrodes 120. The data lines DL and the scan lines are staggered. The active devices are electrically connected to the scan lines SL and the data lines DL, and the second electrodes 120 are electrically connected to the active devices. The first electrodes 130 are disposed on the substrate 100. Each of the first electrodes 130 includes a plurality of slits. The first polarized patterns P4 in a direction D1 perpendicular to the substrate 100 overlap with the second electrodes 120 and partially overlap with the first electrodes 130. The first polarized patterns P4 are located between the liquid crystal layer LC and the opposite substrate 200. The extending direction of the first polarized patterns P4 is different from the extending direction of the slits.

Based on the above, in the display panel 50 provided in the invention, the first polarized patterns P4 and the second auxiliary electrodes 210 belong to the same film layer. Therefore, it is not required to form any additional polarizing film at the outer side of the opposite substrate 200, and the manufacturing costs of the display panel 50 may be reduced while the yield of the display panel 50 is increased. In addition, the extending direction of the first polarized patterns P4 provided in the invention is different from the extending direction of the slits of the first electrodes 130 in the pixel array PA, which contributes to the smooth movement of the liquid crystal in the liquid crystal layer LC along a predetermined direction.

Figure 6A:
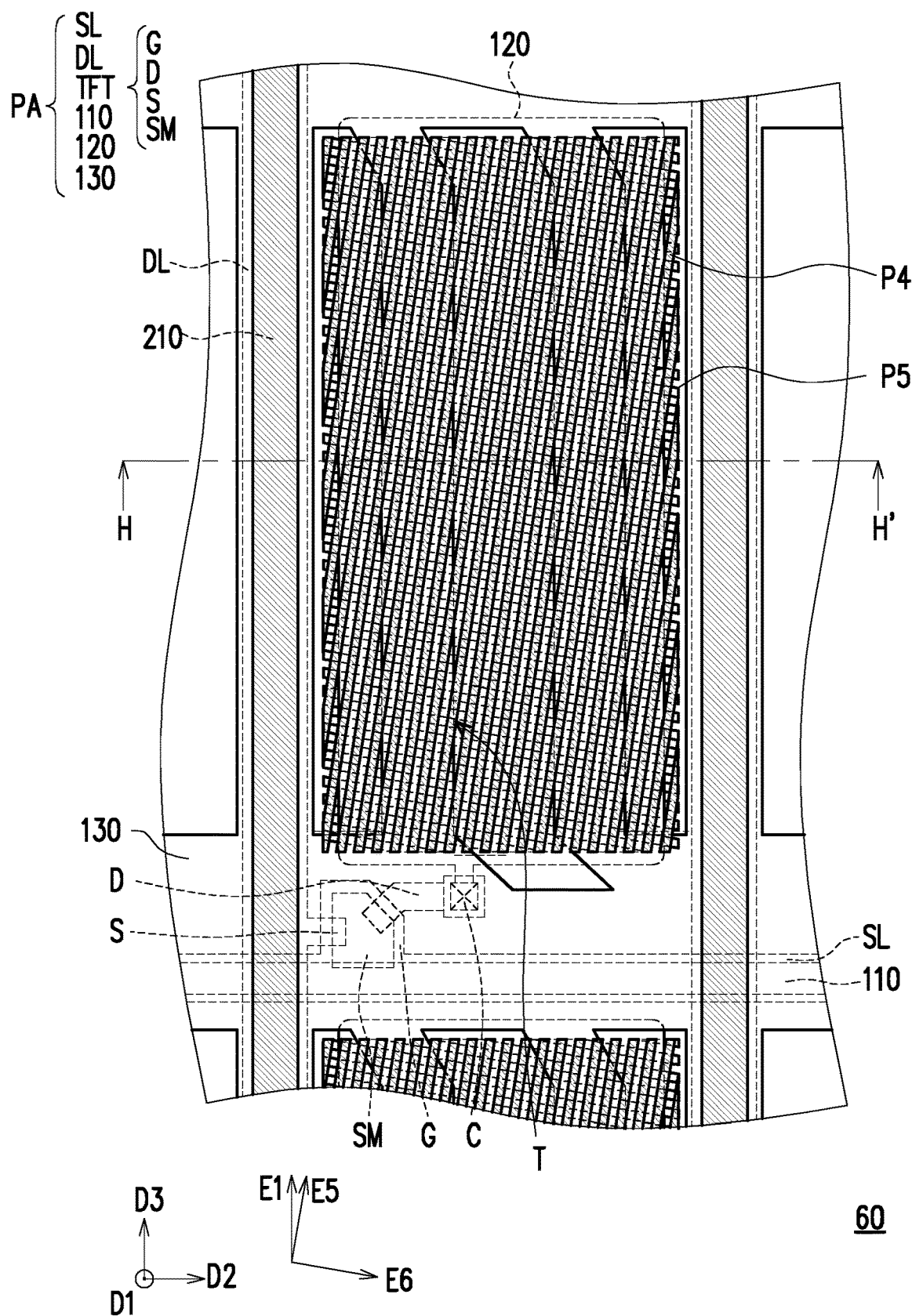
FIG. 6A is a schematic top view of a display panel according to still another embodiment of the invention.
Figure 6B:
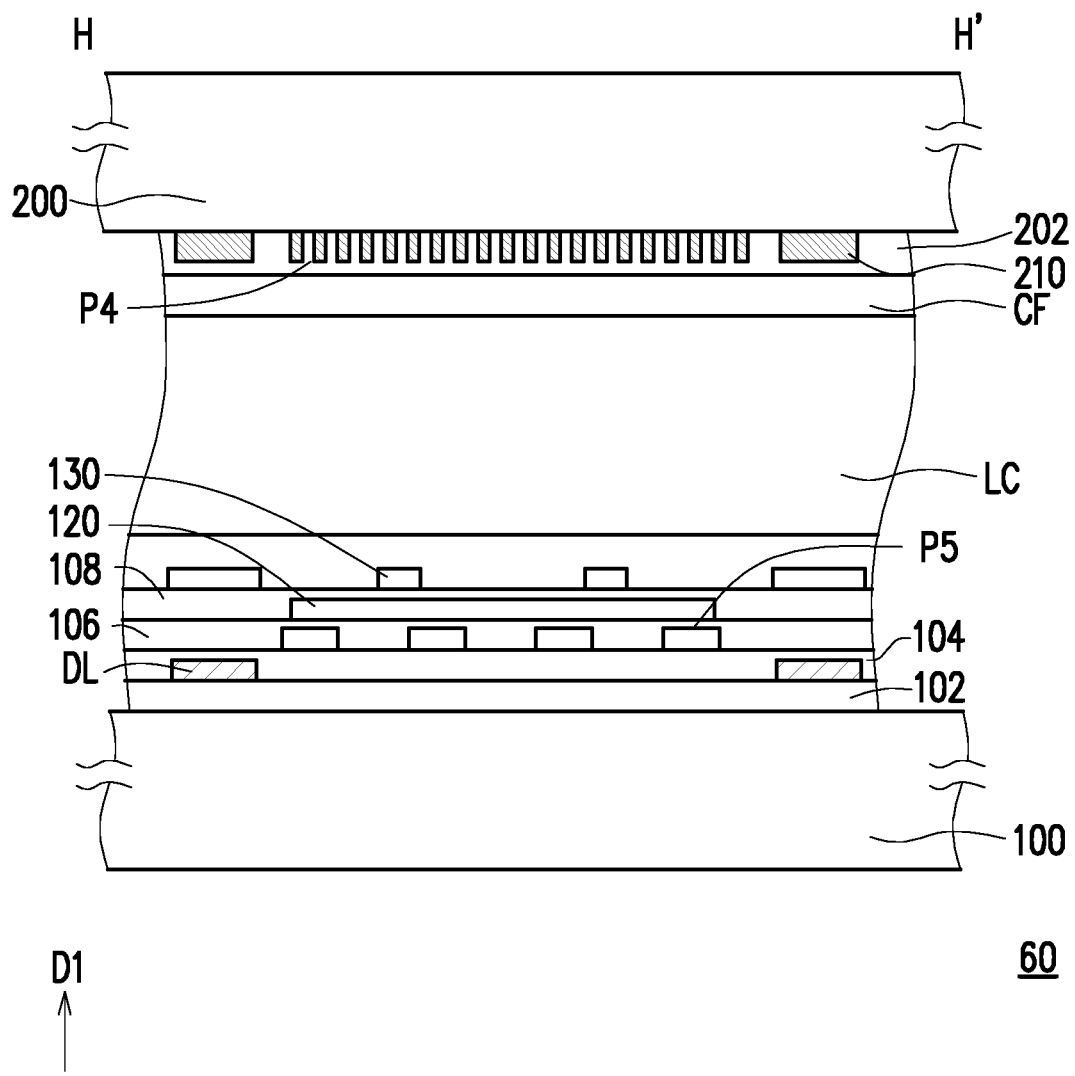
FIG. 6B is a schematic cross-sectional view taken along a section line HH' in FIG. 6A.

FIG. 6A is a schematic top view of a display panel 60 according to yet another embodiment of the invention. FIG. 6B is a schematic cross-sectional view taken along a section line HH' in FIG. 6A. It should be noted that the number and the size of striped patterns of the first polarized patterns P4 and the second polarized patterns P5 depicted in FIG. 6A and FIG. 6B are simply illustrative and do not serve to limit the number and the size of striped patterns provided in the invention.

Here, it should be mentioned that the reference numbers of components and partial content of the embodiments depicted in FIG. 4A and FIG. 4B are adopted in the embodiments depicted in FIG. 6A and FIG. 6B, wherein identical or similar reference numbers indicate identical or similar components, and descriptions s of the same techniques are omitted. The omitted descriptions may be found in the above embodiments and will not be repeated in the following embodiments.

The main difference between the embodiment depicted in FIG. 4A and FIG. 4B and the embodiment depicted in FIG. 6A and FIG. 6B lies in that there are plural second polarized patterns P5 between the substrate 100 and the liquid crystal layer LC.

In the embodiment, the second polarized patterns P5 and the first auxiliary electrodes 110 belong to the same film layer, but the invention is not limited thereto. In other embodiments, the second polarized patterns P5 and the scan lines SL or the data lines DL belong to the same film layer.

In one embodiment, the second polarized patterns P5 in a direction D1 perpendicular to the substrate 100 overlap with the first polarized patterns P4, wherein the extending direction E6 of the second polarized patterns P5 intersects with the extending direction E5 of the first polarized patterns P4. In one embodiment, the extending direction E6 of the second polarized patterns P5 is perpendicular to the extending direction E5 of the first polarized patterns P4.

In one embodiment, an optical compensation film may be arranged at an outer side of the substrate 100 or the opposite substrate 200, but the invention is not limited thereto. In the embodiment, the second polarized patterns P5 are arranged between the substrate 100 and the liquid crystal layer LC, and the first polarized patterns P4 are arranged between the opposite substrate 200 and the liquid crystal layer LC; therefore, no additional polarizing film is required to be disposed at the outer side of the substrate 100 and the opposite substrate 200.

To sum up, in the display panel provided in the invention, the first polarized patterns are located between the substrate and the opposite substrate. Therefore, it is not required to form any additional polarizing film at the outer side of the substrate and/or the opposite substrate, and the manufacturing costs of the display panel may be reduced while the yield of the display panel is increased. In addition, the extending direction of the first polarized patterns provided in the invention is different from the extending direction of the slits in the pixel array. Owing to the alignment achieved by the alignment film, the display panel may accomplish better polarizing effects, and the liquid crystal efficiency is enhanced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display panel, comprising:
    a substrate;
    an opposite substrate, disposed opposite to the substrate;
    a liquid crystal layer, disposed between the substrate and the opposite substrate;
    a pixel array, disposed between the substrate and the liquid crystal layer, the pixel array comprising:
        a plurality of scan lines;
        a plurality of data lines, the plurality of data lines and the plurality of scan lines being staggered;
        a plurality of active devices, electrically connected to the plurality of scan lines and the plurality of data lines; and
        a plurality of first electrodes, disposed on the substrate, each of the plurality of first electrodes comprising a plurality of slits;
    a plurality of first polarized patterns, overlapping with the plurality of first electrodes in a direction perpendicular to the substrate, the plurality of first polarized patterns being disposed between the substrate and the opposite substrate, an extending direction of the plurality of first polarized patterns being different from an extending direction of the plurality of slits, wherein each of the plurality of first polarized patterns is composed of a plurality of striped patterns in parallel, and an included angle between the extending direction of the plurality of first polarized patterns and the extending direction of the plurality of slits is θ degree, in which θ≠0 and θ≠90; and an insulating layer, disposed between the plurality of first polarized patterns and the plurality of first electrodes.

2. The display panel of claim 1, further comprising:
a plurality of second electrodes, overlapping with the plurality of first polarized patterns in the direction perpendicular to the substrate, the plurality of second electrodes being respectively electrically connected to the plurality of active devices.

3. The display panel of claim 1, wherein
the liquid crystal layer comprises positive type liquid crystal, and
15≤θ≤15.

4. The display panel of claim 3, the plurality of first polarized patterns being disposed between the substrate and the liquid crystal layer, the display panel further comprising:
an optical compensation film disposed on the opposite substrate.

5. The display panel of claim 4, wherein
the plurality of first polarized patterns and the plurality of data lines belong to a same film layer and are separated from each other, and
an included angle between the extending direction of the plurality of first polarized patterns and an extending direction of the plurality of data lines is less than 45 degrees.

6. The display panel of claim 4, further comprising:
a plural of first auxiliary electrodes, disposed above the plurality of data lines, the plurality of first auxiliary electrodes and the plurality of data lines being separated from each other, wherein
the plurality of first polarized patterns and the plurality of first auxiliary electrodes belong to a same film layer and are separated from each other; and
an included angle between the extending direction of the plurality of first polarized patterns and an extending direction of the plurality of first auxiliary electrodes is less than 45 degrees.

7. The display panel of claim 3, further comprising
an optical compensation film disposed on another side of the substrate opposite to the pixel array, the plurality of first polarized patterns being disposed between the opposite substrate and the liquid crystal layer.

8. The display panel of claim 7, further comprising
a plurality of second auxiliary electrodes disposed on the opposite substrate, an extending direction of the plurality of second auxiliary electrodes being identical to an extending direction of the plurality of data lines, the plurality of first polarized patterns and the plurality of second auxiliary electrodes belonging to a same film layer,
wherein an included angle between the extending direction of the plurality of first polarized patterns and the extending direction of the plurality of second auxiliary electrodes is less than 45 degrees.

9. The display panel of claim 1, wherein
the liquid crystal layer comprises negative type liquid crystal, and
75≤θ≤105.

10. The display panel of claim 9, the plurality of first polarized patterns being disposed between the substrate and the liquid crystal layer, the display panel further comprising:
an optical compensation film, disposed on the opposite substrate.

11. The display panel of claim 10, wherein
the plurality of first polarized patterns and the plurality of scan lines belong to a same film layer, and
an included angle between the extending direction of the plurality of first polarized patterns and an extending direction of the plurality of scan lines is less than 45 degrees.

12. The display panel of claim 10, further comprising
a plurality of first auxiliary electrodes, disposed above the plurality of data lines, the plurality of first auxiliary electrodes and the plurality of data lines being separated from each other, the plurality of first polarized patterns and the plurality of first auxiliary electrodes belonging to a same film layer,
wherein an included angle between the extending direction the plurality of first polarized patterns and an extending direction of the plurality of first auxiliary electrodes is less than 45 degrees.

13. The display panel of claim 9, further comprising
an optical compensation film, disposed on another side of the substrate opposite to the pixel array, the plurality of first polarized patterns being disposed between the opposite substrate and the liquid crystal layer.

14. The display panel of claim 13, further comprising
a plurality of second auxiliary electrodes disposed on the opposite substrate, the plurality of first polarized patterns and the second auxiliary electrodes belonging to a same film layer,
wherein an included angle between the extending direction of the plurality of first polarized patterns and an extending direction of the plurality of second auxiliary electrodes is less than 45 degrees.

15. The display panel of claim 1, further comprising
a polarizing film, disposed on the substrate or the opposite substrate where none of the plurality of the first polarized patterns is disposed; and
an optical compensation film, disposed between the polarizing film and the substrate or between the polarizing film and the opposite substrate.

16. The display panel of claim 1, wherein a width of each of the plurality of striped patterns is within a range from 15 nm to 120 nm, and a gap between the adjacent striped patterns is within a range from 15 nm to 120 nm.

17. The display panel of claim 1, further comprising
a plurality of second polarized patterns, disposed on the substrate or the opposite substrate where none of the plurality of first polarized patterns is disposed, the plurality of second polarized patterns overlapping with the plurality of first polarized patterns in the direction perpendicular to the substrate, wherein an extending direction of the plurality of second polarized patterns is perpendicular to the extending direction of the plurality of first polarized patterns.

18. The display panel of claim 6, the plurality of first auxiliary electrodes acting as touch electrodes.

19. The display panel of claim 8, the plurality of second auxiliary electrodes acting as touch electrodes or view-angle control signal electrodes.

20. The display panel of claim 2, the plurality of second electrodes being disposed between the plurality of first electrodes and the substrate or disposed between the plurality of first electrodes and the liquid crystal layer.

* * * * *